United States Patent [11] 3,575,056

| [72] | Inventor | William J. Schlapman |
| | | Winneconne, Wis. |
| [21] | Appl. No. | 783,617 |
| [22] | Filed | Dec. 13, 1968 |
| [45] | Patented | Apr. 13, 1971 |
| [73] | Assignee | J. I. Case Company |
| | | Racine, Wis. |
| | | Continuation-in-part of application Ser. No. 625,122, Mar. 22, 1967, now abandoned. |

[54] TRACTOR WITH ATTACHMENTS
8 Claims, 9 Drawing Figs.

[52] U.S. Cl. .................................................. 74/15.2, 15/82
[51] Int. Cl. ............................................................ F16h 37/06
[50] Field of Search .......................................... 15/82, 328, 340; 74/11, 15.6, 15.63, 15.66, 423, 385, 15.2; 37/43; 180/53; 56/(Inquired); 143/36

[56] References Cited
UNITED STATES PATENTS

| 2,580,110 | 12/1951 | Mabry | 143/36X |
| 2,694,421 | 11/1954 | Shrewsbury | 143/36X |
| 2,548,676 | 4/1951 | Milz et al. | 15/82 |
| 2,572,115 | 10/1951 | Crumb | 180/53 |
| 2,578,097 | 12/1951 | Soss | (180/53FEUX) |
| 3,349,631 | 10/1967 | Schlapman et al. | 74/15.63 |

FOREIGN PATENTS

| 720,117 | 12/1954 | Great Britain | 180/53 |
| 859,663 | 1/1961 | Great Britain | 180/53 |

OTHER REFERENCES
Publication " Tennant 85 Power Sweeper" G. H. Tennant Co., 701 North Lilac Drive, Minneapolis, Minn., Copy in 15/328 received 2/64.

*Primary Examiner*—Edward L. Roberts
*Attorney*—Arthur J. Hansmann

ABSTRACT: A garden-type of tractor with attachments, such as a snow thrower, a rotary broom, a rotary lawn mower, and the like. A gear box is swingably mounted on the tractor for selective power transmission between the tractor prime mover and the selected one of the mentioned attachments. An input shaft is in the gear box, and it is constantly rotated by the prime mover in only one direction. However, an output shaft is in the gear box and is in driving relation to the input shaft and is rotated in accordance with the direction of swinging adjustment of the gear box on the tractor. Thus, the attachments are operatively connected to the output shaft to be accordingly driven or rotated in the desired directions. Further, connection means extend between the tractor frame and the gear box, in one embodiment of the invention, for holding the gear box in its selected position. In another embodiment of the invention, connection means extend between the tractor axle, which is pivotal, and the gear box, for securing the gear box with the pivotal axle and have it pivot or oscillate along with the pivoting of the axle.

Patented April 13, 1971
3,575,056
2 Sheets-Sheet 1
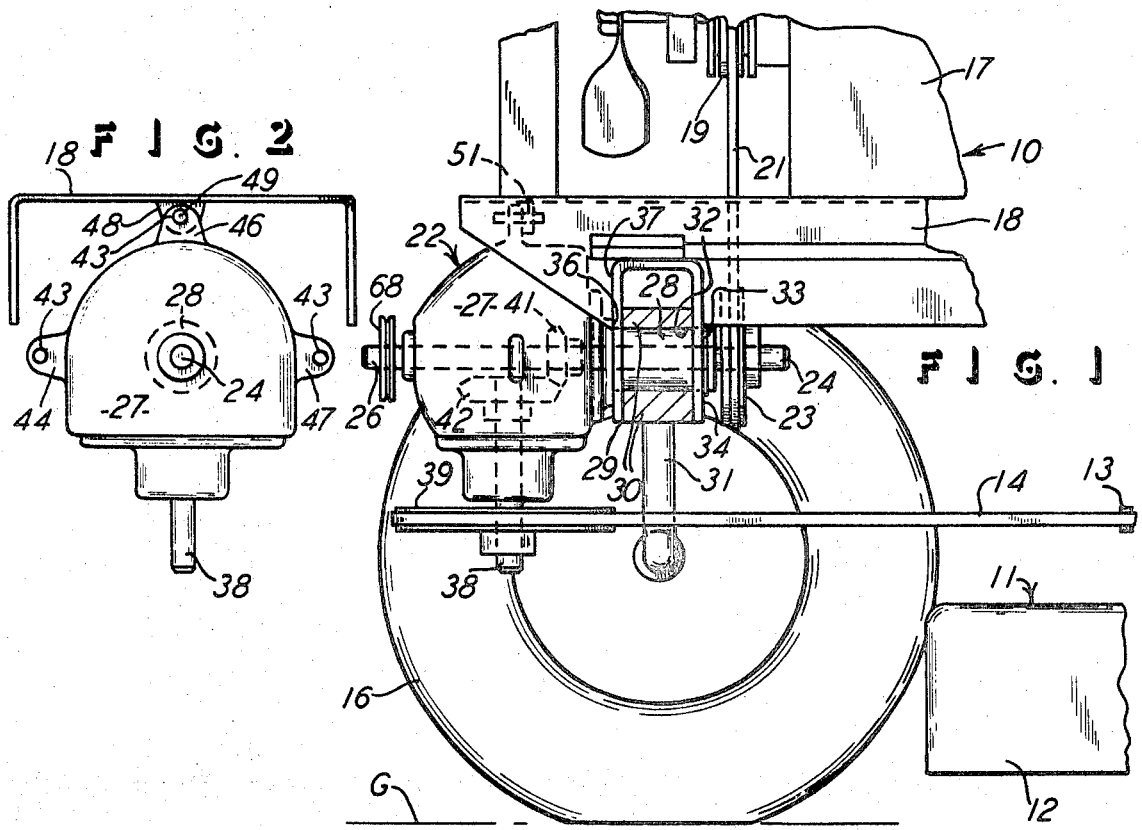
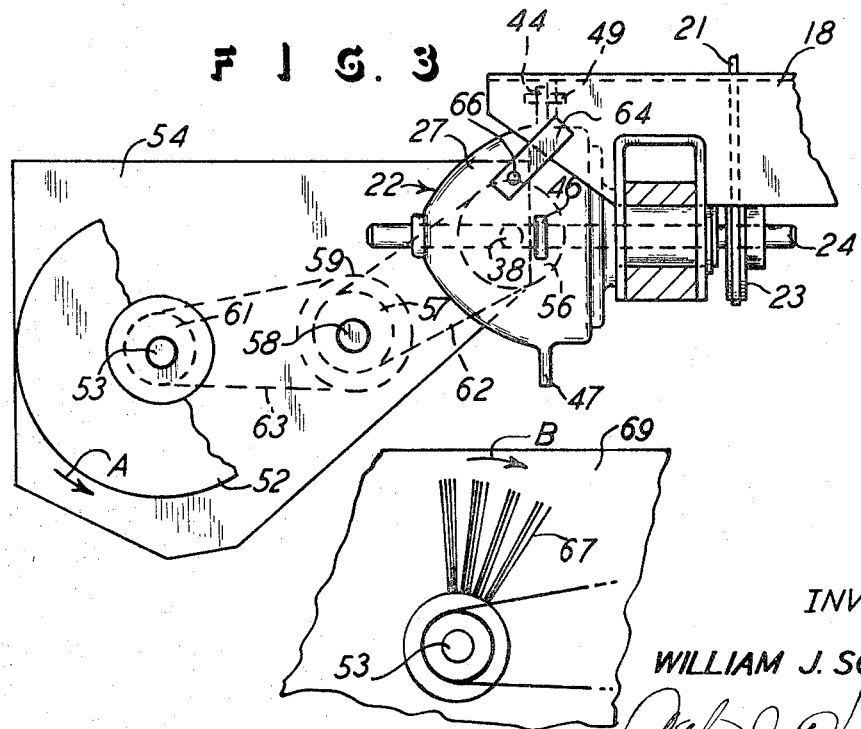
INVENTOR:
WILLIAM J. SCHLAPMAN
ATTORNEY Patented April 13, 1971

INVENTOR:
WILLIAM J. SCHLAPMAN
Arthur J. Hansmann
ATTORNEY

TRACTOR WITH ATTACHMENTS

This is a continuation-in-part of U.S. Pat. application Ser. No. 625,122, filed Mar. 22, 1967.

BACKGROUND OF THE INVENTION

The invention relates to a tractor with attachments, such as snow throwers, rotary brooms, rotary lawn mowers, and the like.

The prior art is already aware of attachments which are selectively mountable on a tractor, and which are driven by the tractor prime mover through a drive connection, such as a power-takeoff shaft. Further, the prior art discloses drive connections between a tractor and selected attachments, with the connection including a gear box which is movable on the tractor to direct the output of the gear box in a selected direction. Such selected direction may result in providing a drive for the attachments, with the drive going to either side of the fore-and-aft direction of the tractor. Thus, the gear box is known to be swingably mounted on the tractor to present an output shaft and a working implement to either side of the tractor, as desired.

In the aforementioned prior art, the gear box is not arranged and disposed to selectively drive attachments with both horizontal and with vertical driven shafts. Thus the versatility of the prior art is limited generally to driving only a single attachment, although the drive may be arranged so that it can position the attachment or its working implement to either side of the tractor. However, the prior art is limited in the number of attachments that its tractor can accommodate, and it generally requires reversing mechanism in the rotational drive direction to the attachment so that when the attachment's implement is on one side it rotates in what is then a forward direction, and when the attachement's implement is on the other side of the tractor the reversing mechanism has been engaged and it will therefore still cause the working implement to rotate in a forward direction. This feature is not desired in the present invention, and this invention therefore alters this and provides the desired direction of drive to the various implements in accordance with the specific requirements of each of the several implements. This is of course accomplished without the requirement of reversing mechanism.

Still further, the present invention provides a means for readily and easily controlling the desired drive to various attachments, though each attachment requires a different direction of drive as well as location for making the drive connection between the tractor and the attachment. Also, the drive connection is located on the fore-and-aft axis of the tractor which can tip to either side without affecting the connection to an attachment.

In one embodiment of the invention, the gear box is swingable and selectively secured relative to the tractor frame. In another embodiment of the invention, the gear box is swingable relative to the frame and is also pivotal relative to the frame, and in this embodiment the tractor has a pivotal axle to which the gear box is secured for pivoting with the axle and therefore pivoting relative to the frame. Therefore, in the second embodiment, the attachment is mounted on the pivotal axle and therefore pivots with the axle, and the attachment and gear box are drivingly connected together. With this arrangement, the gear box is secured to the pivotal axle to pivot therewith, just as the attachment pivots with the axle, so the drive between the gear box and the attachment remains in a desired oriented position and is not twisted or distorted when the attachment and axle pivot as desired. In this manner, a more efficient and powerful and safer drive is provided between the gear box and the attachment.

BRIEF DESCRIPTION OF THE DRAWING

FIG. 1 is a side elevational view of a fragment of a tractor and a fragment of an attachment and showing the drive connection therebetween.

FIG. 2 is a front elevational view of certain parts shown in FIG. 1.

FIG. 3 is a side elevational view of a fragment of FIG. 1, but showing an attachment different from that shown in FIG. 1.

FIG. 4 is a side elevational view similar to FIG. 3 but showing a fragment of still another attachment.

DESCRIPTION OF THE PREFERRED EMBODIMENTS

Figure 5:
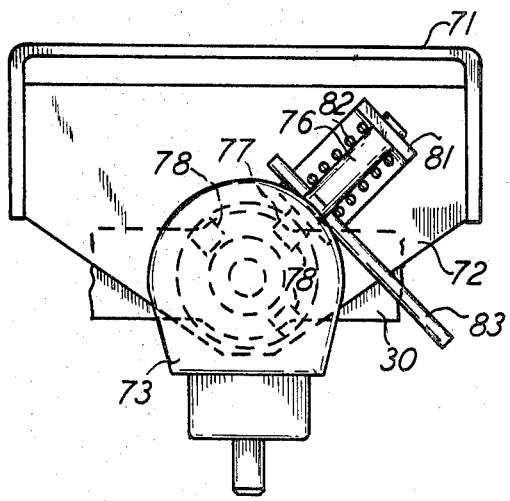
FIG. 5 is a front elevational view similar to FIG. 2 but showing another connecting means for the gear box.

A tractor 10 is fragmentarily shown, along with an attachment 11 which is shown to be a fragment of a rotary mower which has a housing 12 and a pulley 13 which is shown only fragmentarily. It will of course be understood that the rotary mower 11 has a vertically disposed driven shaft (not shown) centrally located with respect to the pulley 13 receiving the belt 14. Thus, in any well-known manner, the mower 11 is mounted with respect to the tractor 10 to be conveyed thereby as the tractor moves over the ground, indicated by the line G, by means of ground wheels, such as the shown tractor ground wheel 16, and movement would be to the left as viewed in FIG. 1, and this is forward with respect to the tractor 10.

The tractor has a prime mover 17, which may be a gasoline engine mounted on a tractor frame 18. A pulley 19 extends forwardly of the engine 17, and a belt 21 extends downwardly to a gear box generally designated 22. The box 22 is swingably mounted on the tractor 10, and a pulley 23 receives the engine belt 21, and the pulley 23 is affixed to the gear box input shaft 24. Thus the gear box 22 is powered by the engine 17.

The input shaft 24 extends to its forward end designated 26, and such extent is through a gear box housing 27. The housing 27 includes a circular boss 28 rotatably received in a frame piece 29 extending laterally of the tractor 10 and as a part thereof. Thus the boss 28 and the frame piece 29, also serve to pivotally support a tractor front axle 30 which provides a support for the tractor front wheels, such as the wheel 16, and the front wheel spindle 31. Thus the circular boss 28 is concentric with the input shaft 24 and is rotatably mounted on the tractor frame piece 29 so that the gear housing 27 can be swung or rotated about the axis of the input shaft 24. Further, the shaft 24 is disposed on the longitudinal center plane of the tractor 10, so that it is centered on the tractor 10 and extends forwardly thereof in its extending end 26. Thus the tractor axle 30 has a circular opening 32 which snugly receives the cylindrical boss 28 for the rotation of the housing 27, as described. Also, a snapring 33 extends around the rearward end of the box 28 and abuts the rear surface 34 of the frame portion 29 to prevent the gear housing 27 from sliding forwardly out of the circular opening 32. Also, the housing 27 has a shoulder 36 abutting the surface 37 of the portion 29 so that the housing 27 cannot slide rearwardly with respect to the opening 32. Similarly, the axle pieces 30 are pivotal on the boss 28 and extend to the both sides of the tractor and to the wheel spindles 31, which are on opposite sides of the tractor. Any vertical movement of the tractor front wheels will not move the gear box 22, so that drive connection to the attachments remains stable, as desired.

The gear box 22 includes an output shaft 38 which supports a power-takeoff member shown in the form of the pulley 39. The pulley 39 of course receives the belt 14 extending to the rotary mower 11. Also, the gear box 22 includes a bevel gear 41, mounted on and in driving relation with the input shaft 24, and the box includes a bevel gear 42, mounted on and in driving relation with the output shaft 38. The gears 41 and 42 are in constant mesh, regardless of the adjusted or swung position of the housing 27. Thus, rotation of the input shaft 24 causes rotation of the output shaft 38, through the meshing gears 41 and 42. Thus it will be understood that the mower 11 is driven by the tractor engine 17 when the mower 11 is attached to the tractor and the gear box 22 is disposed to have its output shaft 28 directed downwardly, as shown in FIG. 1.

When it is desired to drive attachments other than the mower 11, the gear box 22 may be swung or rotated on the tractor 10, as the box housing 27 is rotated in the opening 32 on the tractor 10 as described. Thus it will be noted that the housing 27 has three pin holes 43 which are respectively located in the ears 44, 46, and 47 spaced around the housing 27. The holes 43 are on a common arc generated about the axis of the input shaft 24, as shown in FIG. 2. Also, an ear or connection 48 exists on the tractor frame 18, and a pin 49 connects the housing ear 46 and the tractor ear or connector 48 in the position shown in FIGS. 1 and 2. Thus, the tractor frame 18 has an opening 51 in the connector 48, and this opening is also on the arc locating the housing openings 43. Therefore, when the housing 27 is rotated about the axis of the input shaft 24, each one of the housing openings 43 will align with the tractor opening 51. Then the pin 49 can secure the housing 27 in the selected rotated position.

The pin 49 is of course readily removable and it therefore permits the swinging or rotation of the housing 27. Also, the gears 41, and 42 remain in mesh during the swinging movement and for any of the adjusted positions described. These positions are shown to be three, namely, with the output shaft 38 downwardly, as in FIG. 1, and with the output shaft 38 either to the left side or to the right side with respect to the forward direction of the tractor 10.

FIG. 3 shows the gear box 22 to be swung to a position to have the output shaft 38 directed to the right with respect to the tractor 10. Also, the mower 11 has been removed from the tractor 10 and a snow thrower is indicated to be attached on the tractor. Thus a snow thrower auger 52 is shown disposed forwardly of the tractor 10, and the auger would rotate in the direction of the arrow A. The auger also is shown to include a shaft 53, and a side 54 is shown as a part of the snow thrower. There would of course be another side 54 on the tractor left side.

Thus the gear box output shaft 38 is horizontally disposed in FIG. 3, and it carries a pulley 56 which is drivingly connected to a pulley 57 mounted on a shaft 58 on the snow thrower side 54. Likewise, a pulley 59 may be mounted on the shaft 58, and a pulley 61 is mounted on the shaft 53. Thus belts 62 and 63 drivingly connect the pulleys 56 and 57, and the pulleys 59 and 61, respectively. Thus, where it is desired to have the auger 52 rotate in the direction of the arrow A, the shaft 38 would also rotate in the counterclockwise direction.

Thus, in FIG. 3, the housing 27 has been swung to where the shaft 38 and its pulley 56 are to the right side of the tractor 10, and thus the housing connector or ear 44 is adjacent the tractor connector or ear 48, so the connecting pin 49 secures the housing 27 in the position shown.

The auger 52, and the snow thrower parts mentioned, are suitably releasably connected to the tractor 10 by means of a bracket 64, affixed one on each side of the tractor frame 18, and a supporting pin 66 which connects between the brackets 64 and the snow thrower sides 54, in any suitable manner.

When it is desired to connect still a third attachment to the tractor 10, the housing 27 may be rotated to a third position to provide the necessary drive for still a different attachment. Thus a rotary broom, such as that designated 67 in FIG. 4, may be mounted with its axis of rotation on the shaft 53. The broom may therefore have supporting sides, such as the sides 69 which releasably attach to the tractor frame 18, as with the sides 54. The broom 67 is to be rotated clockwise, that is in the direction of the arrow B. In this instance, the gear housing 27 is again swung or rotated, and this time so that the shaft 38 and the pulley attached thereto will extend to the left side of the tractor 10, and that would be to the near side in FIG. 4, opposite from the side shown with the extent of the shaft 38 in FIG. 3. Thus it will be understood that the gear housing is then rotated to where the opening 43 in the ear 47 will align with the tractor pin opening 51. Then, without any reversing mechanism involved nor required, the same and constant rotation of the input shaft 24 will cause the desired clockwise rotation of the broom 67. This clockwise rotation is of course reverse from the desired counterclockwise rotation when the auger attachment is employed.

Still further, the input shaft forward end 26 drivingly supports a pulley 68 which is available for driving any other attachment, or for any power-takeoff to a stationary implement mounted adjacent the tractor 10 but not necessarily on the tractor 10. Examples include the powering of generators, compressors, power elevators, and any other front mounted attachment, such as the attachments or implements already shown and described.

It will also of course be understood that the attachments, such as the mower 11, the snow thrower, and the rotary broom, all have their driven pulleys, such as the mower pulley 13, and the snow thrower pulley 57, aligned with the pulley 39 or 56 on the gear box 22 when the gear housing 27 is swung to the position of connecting with the particular attachment. Thus, the installation of the belt 14 or 62 is the only additional connection required between the tractor and the attachment to complete the mounting of the attachment on the tractor and the drive to the attachment.

Figure 6:
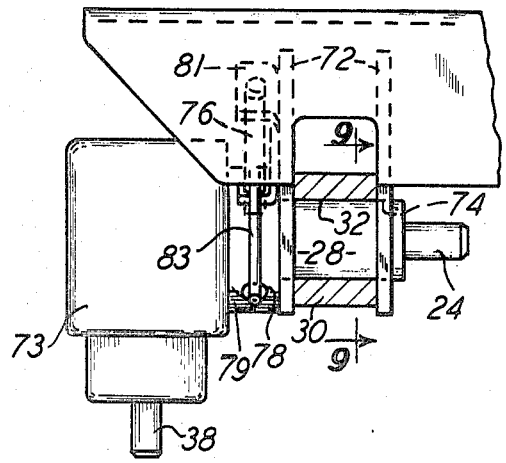
FIG. 6 is a side elevational view of FIG. 5, and showing the axle in section.
Figure 9:
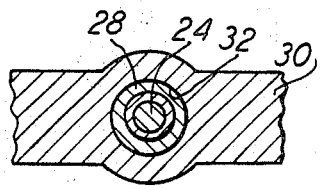
FIG. 9 is a sectional view taken along the line 9–9 of FIG. 6

Another embodiment is shown in FIGS. 5 and 6 where there is a tractor frame piece 71 having two cross plates 72 which flank the tractor axle 30. A gear box 72 is of a slightly different shape that the other gear box in FIG. 1, but the box also has a circular boss 28 which extends through the axle circular opening 32, as shown in FIG. 1 also. Further, the plates 72 have circular openings 74 through which the gear box boss 28 extends and is rotatable therein. Thus, as in FIGS. 1 and 2, the gear box 73 is swingably mounted on the tractor frame and it provides the pivot mounting for the pivotal axle 30. Also, the gear box 73 has the input shaft 24 and the output shaft 38, as in FIGS. 1 and 2, and the box may also have another output shaft 26 as in FIGS. 1 and 2.

The gear box 73 in the embodiment shown in FIGS. 5 and 6 is releasably connected to the tractor frame, and so is the gear box in FIG. 1 and 2. However, the connecting means is different between the two embodiments, and the showing in FIGS. 5 and 6 is such that a pin 76 is movable radially with respect to the gear box pivotal axis, which is the axis of the input shaft 24. The inner end 77 of the pin 76 is then received in one of three openings 78 in the gear box circular portion 79. Thus, in the position shown in FIGS. 5 and 6, the pin 76 is received in the center one of the three openings 78. It will be understood that if the pin 76 were withdrawn from that center opening 78, then the gear box 73 could be swung about the axis of the shaft 24, and the pin 76 could be inserted in either one of the other two openings 78 so that the output shaft 38 would be to the left side or to the right side of the tractor, as desired and as described in connection with FIGS. 3 and 4.

The pin 76 is mounted on the U-shaped bracket 81 suitably secured to the front one of the two plates 72, and the pin 76 slides in the legs of the bracket 81. A compression spring 82 surrounds the pin 76 and bears against one of the legs of the bracket 81 and against a control rod 83 which passes through an opening in the pin 76. Thus it will be understood that the operator can grasp the control rod 83 and pull upwardly on the pin 76 and the spring 82 to remove the pin end 77 from the gear box hole 78. Of course release of the control rod 83 will permit the pin end 77 to enter one of the three holes 78 when one of the holes is aligned with the pin 76, as desired.

Figure 7:
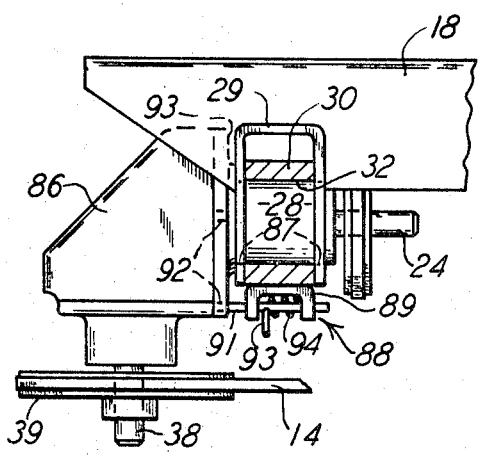
FIG. 7 is a side elevational view similar to FIG. 6 but showing a different gear box and a different connection for the gear box and with the connection being between the axle and the gear box.
Figure 8:
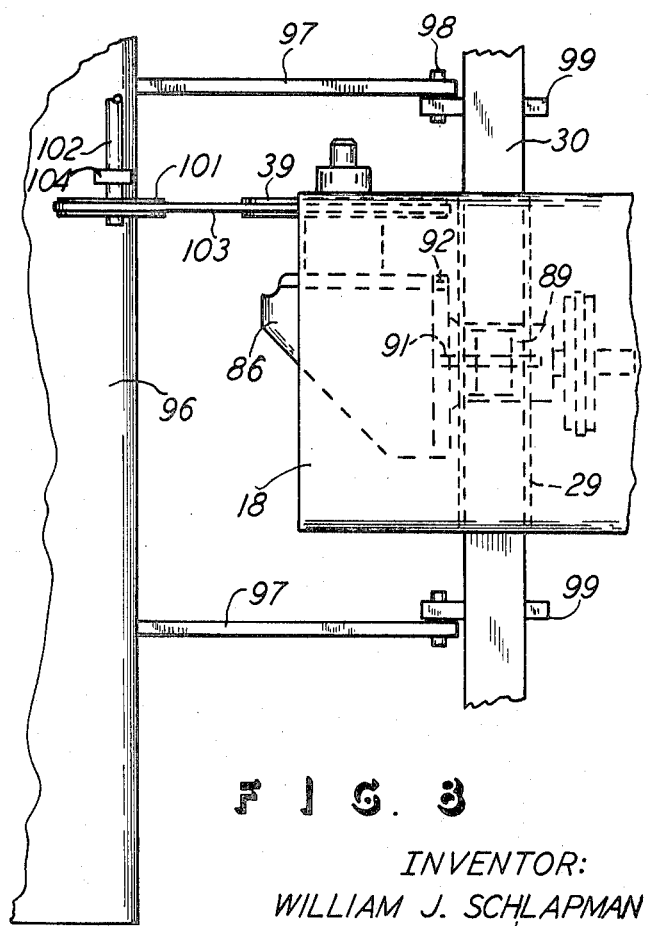
FIG. 8 is a top plan view of FIG. 7, but showing the gear box in a different position and showing an attachment added thereto.

FIGS. 7 and 8 show still another embodiment of the invention, and in this embodiment the releasable connecting means between the gear box and the tractor are mounted on the pivotal axle so that gear box can pivot or swing along with the pivoting of the axle 30. A gear box 86 is again mounted with its boss 28 extending through the axle opening 32, and the tractor frame includes the inverted U-shaped piece 29 which has suitable openings 87 for also rotatably receiving the gear box boss 28. FIG. 7 is also showing the gear box output pulley 39 and the drive belt 14, which belt would be extending rearwardly of the tractor, as shown in FIG. 1. Connecting means, generally designated 88, is shown to include a U-shaped bracket 89 which is suitably secured to the tractor pivotal axle 30. A latch pin 91 slidably extends through the bracket 89 and into openings 92 extending into the back surface 93 of the gear box 86. Again it will be understood that there will be three openings 92 in the gear box 86, so the gear box can be swung about its input shaft 24 and can be secured in the three 90° positions previously described in the other embodiments. The connecting means 88 also includes a control pin 93 which the operator can grasp and thereby retract the latch pin 91 from the opening 92 to permit swinging the gear box 86. Also, a compressing spring 94 extends between the bracket 89 and the control pin 93 to urge the latch pin 91 into securing position with the gear box 86.

FIG. 8 shows the full advantage of the connecting means 88, and in this showing a snow blower housing 96 is fragmentarily shown. The housing has rearwardly extending arms 97 which connect to the tractor pivotal axle 30 through pivot pins 98 and arms 99 affixed to the tractor axle 30. Thus the snow blower housing 96 can pivot up and down relative to the tractor frame 18, and of course the snow blower housing 96 can pivot up and down along with the pivoting of the tractor axle 30. Thus, when either end of the tractor axle 30 pivots upwardly, the snow blower housing 96 will tend to correspondingly pivot its corresponding end upwardly. With the gear housing 86 connected to the tractor axle 30, the gear housing 86 also correspondingly pivots. This results in maintaining the gear housing pulley 39 desirably oriented and aligned relative to the pulley 101 mounted on the shaft 102 on the snow blower housing 96. Therefore, the drive belt 103 between pulleys 39 and 101 will not become twisted and will not tend to run off the pulleys. The shaft 102 and therefore the pulley 101 are supported on an upstanding bearing block 104 affixed to the blower housing 96.

I claim:

1. In a tractor with an attachment, an attachment for use with a tractor having a prime mover, said attachment being mountable on said tractor and including a driven member, a work tool included in said attachment and with said work tool being rotatably driven by said driven member in a selected direction, a gear box swingably mounted on said tractor and including an input shaft and an output shaft and two gears in mesh and respectively connected to said shafts, said shafts being disposed to form an angle therebetween and with said input shaft being drivingly connected to said prime mover for rotation in the same direction of rotation in all swung positions of said gear box, said gear box being mounted on said tractor to have said output shaft swingable in an arc around the axis of said input shaft, said output shaft having an end extending away from said input shaft, a plurality of releasable connectors on said tractor and said gear box for connecting said gear box to said tractor and with said connectors being spaced along said arc for selectively and releasably anchoring said gear box in a plurality of swung positions on said tractor to orient said output shaft in selected directions relative to said input shaft, a power-takeoff member on the extending end of said output shaft, a drive connection between said power-takeoff member and said driven member of said attachment for drivingly rotating said work tool of said attachment in said selected direction which is in accordance with the orientation of said output shaft relative to said input shaft, said tractor having a circular opening presenting a circular bearing surface on said tractor, a cylindrical boss on said gear box and rotatably mounted in said circular opening for rotation relative to said tractor while being piloted in said circular opening and with said gear box being releasably retained in selected rotated positions by said releasable connectors.

2. The subject matter of claim 1, wherein said input shaft is disposed parallel to the fore-and-aft axis of said tractor and at the front portion thereof, and said output shaft is disposed at a right angle to said input shaft and is swingable in a plane transverse to said tractor axis for positioning said power-takeoff member to either side of said input shaft and below the level of said input shaft for different swung positions for selective drive connections to said attachment, said releasable connectors having three set positions 90° apart for securing said output shaft in three positions.

3. The subject matter of claim 1, wherein said releasable connectors include retractable pins and pin holes for releasably anchoring said gear box in swung positions on said tractor.

4. The subject matter of claim 1, wherein said gear box includes a housing enclosing said gears and with said input shaft having its two ends extending from said housing, one end of said input shaft forming the drive connection with said prime mover, and a second power-takeoff member on the other end of said input shaft to be available for drivingly connecting to said attachment.

5. The subject matter of claim 1, wherein said tractor includes a front wheel axle pivotally supporting said tractor on a pivot axis extending transverse to the fore-and-aft axis of said tractor, and said input shaft having its axis coaxial with said pivot axis.

6. The subject matter of claim 5, including mounting members on said axle and on said attachment for mounting said attachment on said axle, said releasable connectors being partly on said axle to be connectable between said gear box and said tractor axle for pivotal movement of said gear box and said power-takeoff member in accordance with pivotal movement of said tractor axle.

7. The subject matter of claim 6, wherein said releasable connectors include a spring-loaded pin on said tractor axle and three pin openings spaced 90° apart on said gear box for selectively receiving said pin.

8. The subject matter of claim 5, wherein said gear box cylindrical boss is operatively interposed between said tractor front wheel axle and said remainder of said tractor for providing the pivot support of said tractor by said axle.